UNITED STATES PATENT OFFICE.

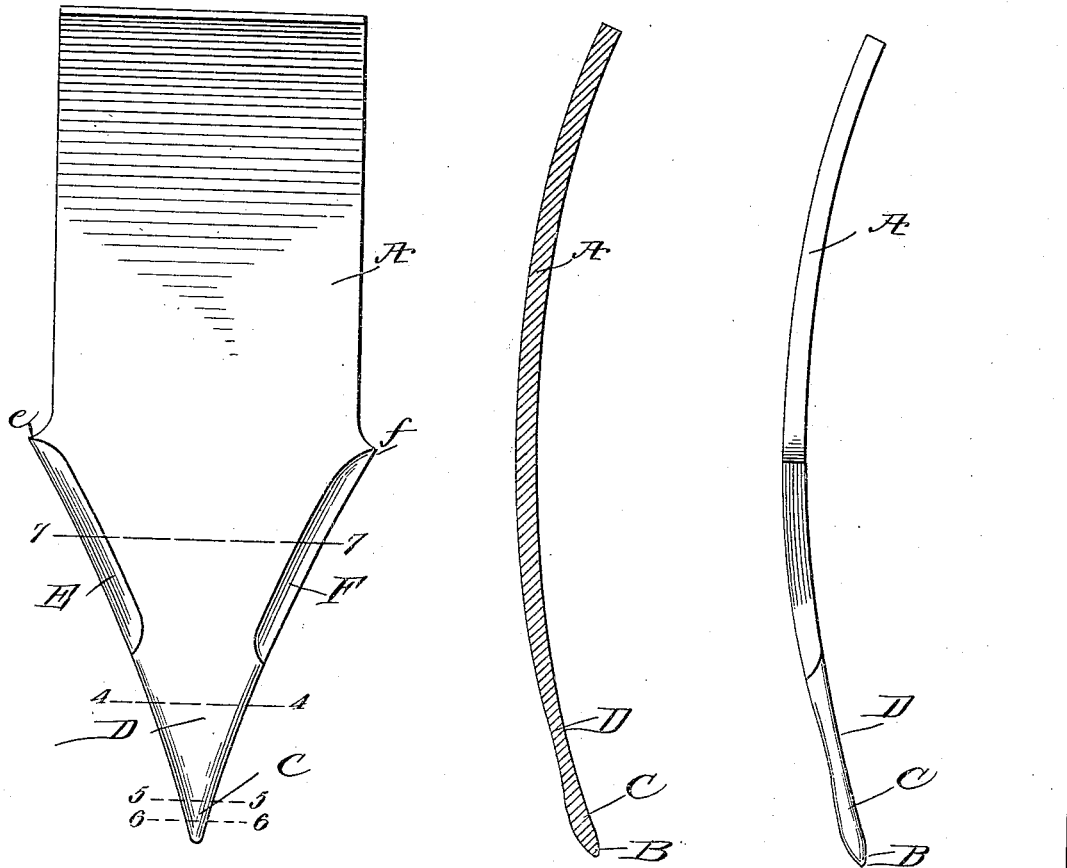

GEORGE W. POBANZ, OF GENESEO, ILLINOIS.

CULTIVATOR-PLOW.

960,194.

Specification of Letters Patent. Patented May 31, 1910.

Application filed April 2, 1910. Serial No. 552,975.

*To all whom it may concern:*

Be it known that I, GEORGE W. POBANZ, a citizen of the United States, residing at Geneseo, in the county of Henry and State of Illinois, have invented a new and useful Improvement in Cultivator-Plows, of which the following is a specification.

My invention relates to improvements in cultivator plows or shovels, and it consists in the combinations, constructions and arrangements herein described and claimed.

An object of my invention is to provide an improved cultivator blade or shovel which will be more readily retained in ground that is rough, hard, or overgrown with weeds, than the ordinary blade.

A further object of my invention is to provide a device in which the point of the blade is so constructed that it will readily enter the ground and does not have to be resharpened like the ordinary blade.

A further object of my invention is to provide a device of such a nature that its durability and wearing qualities are materially increased.

Other objects and advantages will appear in the following specification, and the novel features of the device will be particularly pointed out in the appended claims.

My invention is illustrated in the accompanying drawings forming part of this application, in which—

Figure 1 is a face view of the blade constructed according to my invention. Fig. 2 is a longitudinal section through the center of the blade. Fig. 3 is an edge view. Fig. 4 is a section along the line 4—4 of Fig. 1. Fig. 5 is a section along the line 5—5 of Fig. 1. Fig. 6 is a section along the line 6—6 of Fig. 1, and Fig. 7 is a section along the line 7—7 of Fig. 1.

In carrying out my invention I provide a main body A consisting of a curved bar, as shown in the drawings. This bar terminates in a triangular-shaped end which constitutes the cutting part of the implement. The point B differs from the ordinary shovel point in being circular in cross section as shown in Fig. 6. The part C immediately above the point is somewhat flattened as shown in Fig. 5, while above part C is a part D which is still further flattened. Between the portion D and the main body A of the blade, the edges which diverge outwardly, are sharpened as shown at E and F. The upper end of the sharpened portions terminate in the outwardly extended portions *e* and *f*, respectively.

From the foregoing description of the various parts of the device the operation thereof may be readily understood. As the implement is drawn along, the rounded point B readily enters the ground up to the cutting edges E and F. In the ordinary blade, the cutting edges extend clear to the point, and these edges are continually being worn away. With the ordinary blade, therefore, it is necessary to frequently heat and "draw out" the point and to sharpen the edges. Moreover, blades which are sharpened along their diagonal edges from the point upward are difficult to maintain in the ground, since the edges tend to cam the blade from the ground. On the other hand the rounded edge of my improved blade does not tend to cam the blade out of the ground, but to retain it in the ground to permit the cutting edges to come into play. There is no necessity of grinding the edges or drawing out the point.

The above advantages result in adding to the life of the blade while at the same time rendering it more efficient when in actual use.

I claim.

1. A cultivator blade or shovel comprising a body portion terminating in a triangular shaped head, having a point of cylindrical cross section, a flattened portion having rounded edges immediately adjacent said point, and a flattened portion having beveled or sharpened edges between the body portion and the first mentioned flattened portion.

2. A cultivator blade or shovel comprising a body portion terminating in a triangular shaped head, having a point of cylindrical cross section adapted to enter the ground, and a flattened portion between said point and said body portion, provided with beveled or cutting edges.

GEORGE W. POBANZ.

Witnesses:
FRED W. RISTAN,
CHARLES G. DAVIS.